United States Patent

Ohmi

[11] 3,938,424
[45] Feb. 17, 1976

[54] BRAKE SERVO-MOTOR
[75] Inventor: Atsushi Ohmi, Anjo, Japan
[73] Assignee: Aisin Seiki Kabushiki Kaisha, Kariya, Japan
[22] Filed: Nov. 27, 1973
[21] Appl. No.: 419,274

[30] Foreign Application Priority Data
Nov. 29, 1972 Japan............................. 47-137202

[52] U.S. Cl. ............................. 91/369 B; 91/376 R
[51] Int. Cl.² ........................................... F15B 9/10
[58] Field of Search .......... 91/369 B, 369 A, 369 R; 60/552

[56] References Cited
UNITED STATES PATENTS

| | | |
|---|---|---|
| 2,980,068 | 4/1961 | Stelzer............................. 91/369 B |
| 2,990,815 | 7/1961 | Ayers............................... 91/369 B |
| 3,013,533 | 12/1961 | Brown.............................. 91/369 B |
| 3,082,745 | 3/1963 | Brooks............................. 91/369 B |
| 3,183,789 | 5/1965 | Stelzer............................. 91/369 B |

Primary Examiner—Paul E. Maslousky
Attorney, Agent, or Firm—Haseltine, Lake & Waters

[57] ABSTRACT

A differential servo-motor mechanism in which manual force is supplemented by power assistance, comprising, a housing, a pressure responsive wall in the housing, valve means associated with said wall and being movable relative thereto to control the differential pressure acting on said wall, an output member, a resilient element for normally urging the wall toward its rest position, and reaction means characterized by a plurality of reaction elements arranged to provide the reaction means in the form of levers each having first, second, third and fourth points spaced radially inward from each other and engageable with the resilient element, the wall, the output member and the valve means respectively. The wall is initially movable to transmit force through the second point under association of the resilient element to the output member independently of the valve means, the reaction element being distorted during initial movement of the wall in response to resistance of the output member to engage the reaction means with the valve means and transmit movement of the latter and the wall after the initial movement of the wall to the output member.

5 Claims, 3 Drawing Figures

BRAKE SERVO-MOTOR

BACKGROUND OF THE INVENTION

This invention relates to differential servo-motors and more particularly to the type of servo-motors used to operate the hydraulic brake systems of motor vehicles.

Various differential servo-motors have been proposed heretofore for use on automotive vehicle brake systems to enable the substantial manual effort for braking to come into play after actual braking begins as disclosed and described specifically in prior U.S. Pat. No. 3,013,533 in recognition of advantages of smaller initial manual force to initiate braking but of a relatively uniform relationship of manual force and power throughout the entire braking range.

In such servo-motors, the foregoing object and others are attained through an additional provision of a reaction element in the form of a large ring made of resilient, flexible material such as rubber in addition to the ordinary associating parts with an aim that powered effort supplied by the servo-motor in the early stage of braking will sufficiently overcome the unavoidable resistance of return springs and the friction of certain movable parts in the servo-motor, master cylinder and in the actuators and at the brake shoes of the foundation brake unit.

SUMMARY OF THE INVENTION

A principal object of the present invention is to provide a differential servo-motor having no additional reaction element but which can utilize the powered effort to overcome the initial resistances to braking so that manual effort comes into play after actual braking begins.

The foregoing object and others are attained according to at least one aspect of the present invention through a utilization of the ordinary restoring spring which is an unavoidable and customary part in this type of servo-motor.

In the disclosed embodiments, there are comprised a housing, a pressure responsive wall in said housing, valve means associated with said wall and being movable relative thereto to control the differential pressure acting on said wall, control means for manually moving said valve means, an output member, reaction means having first, second, third and fourth points spaced radially from each other and radially inward from said first points and engageable with the restoring spring, said wall, said output member and said valve means respectively, said restoring spring normally maintaining said fourth point spaced from said valve means, said wall being initally movable to transmit force through said second point under association of said resilient means to said output member independently of said valve means, said restoring spring being distorted during initial movement of said wall in response to resistance of said output member to engage said reaction means with said valve means and transmit movement of the latter and said wall after said initial movement of the wall.

DESCRIPTION OF THE ILLUSTRATED EMBODIMENT

Figure 1:
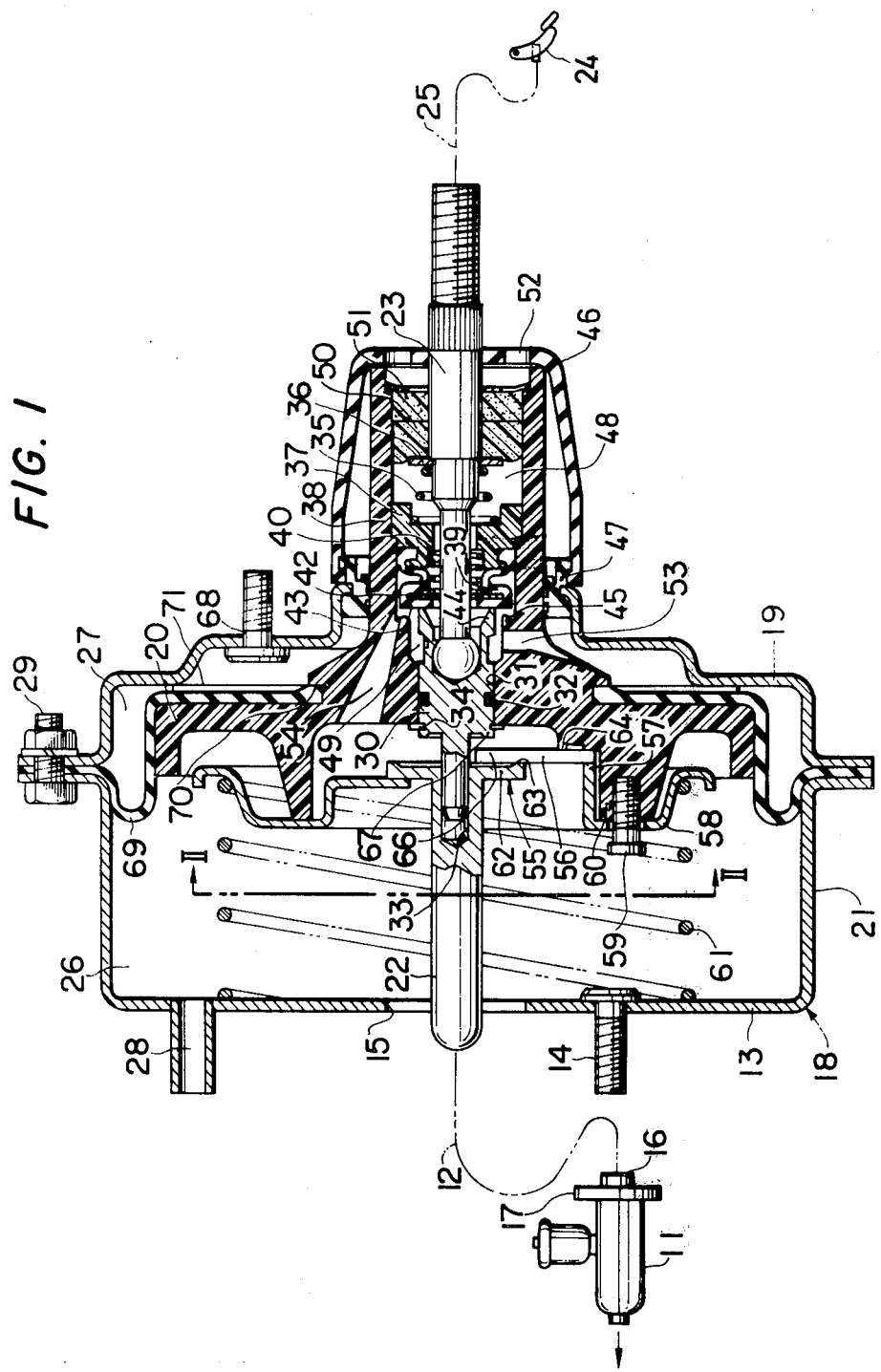
FIG. 1 is a longitudinal sectional view through the servo-motor with the master cylinder and the brake pedal shown in imaginary form.

In FIG. 1, there is diagrammatically illustrated a differential pressure servo-motor embodying the present invention for particular use in hydraulic brake systems of automotive vehicles. In such systems, hydraulic fluid is delivered from a master cylinder 11 to actuators (not shown) which apply the brakes at the wheels (not shown). The master cylinder 11 is operatively connected with the servo-motor of the invention as shown by the dotted line 12 by being bolted to a front housing member 13 by means of bolts 14. It should be noted that the master cylinder 11 is shown out of proportion to the servo-motor. An opening 15 at the central portion in the end face of the housing member 13 is for the purpose of provision of a fluid tight connection with an end portion 16 of the master cylinder 11. For such connection, a plurality of the bolts 14 are used for bolting together the wall of the housing member 13 and a flange 17 of the master cylinder 11. The above fluid tight coupling between the master cylinder and the housing member provides a subatmospheric pressure within the housing member 13 as hereinafter will be described in detail. These components are of conventional construction and their operation and use is so well known in the art that a detailed description is not required for a full understanding of the invention.

As seen in FIG. 1, a servo-motor 18 embodying the invention further includes a housing 21 formed of the housing member 13 and another housing member 19. Within the housing 21, a movable wall 20 responds to pressure differentials to move a rod 22 which actuates the master cylinder 11 mounted on the housing 21. The pressure differential acting on the wall 20 is under the control of a valve means 39 actuated manually through means of a line 23 connected to a brake pedal 24 as shown by dotted line 25 by ordinary known means (not shown).

The servo-motor 18 is of the known vacuum suspended type, that is, in its brake released condition, as shown in FIG. 1, vacuum or subatmospheric pressure exists in chambers 26 and 27 formed in the housing 18 at opposite sides of the wall 20 and the wall remains stationary. To actuate the motor, atmospheric air is admitted to the chamber 27 so that the pressure differential on the wall 20 moves it and the rod 22 to actuate the master cylinder 11. The source of vacuum pressure is provided by placing the intake manifold of an internal combustion engine (not shown) in communication with a passage 28.

The housing 21 is made up of the aforesaid forward housing member 13 and the rearward housing member 19 by joining the same together by means of screw 29. As described in the foregoing, the master cylinder 11 is fastened directly to the housing member 13 in position by the bolts 14 for the master cylinder piston (not shown) to receive the forward end of the rod 22. The forward end of the rod 22 is received within a corresponding recessed portion (not shown) in the rearward end of the master cylinder piston (not shown) normally in contact with the end of the rod.

A manual control member 30 is supported for axial movement in a bearing aperture 31 in the wall 20. A seal ring 32 is embedded in a corresponding groove in the control member 30 to provide a fluid-tight relation between the bearing aperture and the member. The rearward end of the member 30 is formed with a bore to provide an axially rigid connection with the spherical forward end of the line 23 by the clamping thereof. The other end of the member 30 is slidably received in a bore 33 formed in the rearward end face of the rod 22. The control member 30 is further provided with a stopper ring 34 which firmly sits in a groove in the member. The member 30 is normally spring biased to the right by a compression spring 35 with the stopper ring 34 abutting the face of the wall 20. The spring 35 is anchored at its right hand end by means of a washer 36 which engages a shoulder in the line 23 and at the other end by a collar 37 which engages a shoulder formed in the internal face of a hub portion 38 extending rightward from the wall 20.

As will be seen in FIG. 1, the generally tubular or bellow-like valve means 39 is formed of resilient material such as rubber and is provided with a compression spring 40 within its internal space to normally provide an expanding tendency for the valve means.

The valve member 39 has its right hand end clamped within an annular groove in the collar 37. An inserted ring member 42 is adapted to provide for the valve means 39 a better valve face 43 which cooperates with a valve seat 44 formed at the right hand end of the control member 30. The valve face 43 further cooperates with another valve seat 45 formed in the internal surface of the hub portion 38 alternately with the seat 44 as will be explained hereinafter.

From the foregoing, it will be apparent that all the aforesaid parts remain in the positions shown in FIG. 1 when the servo-motor 18 is in its rest position, that is, no braking force is applied to the vehicle wheels. It will be noted that the expanding force of the spring 35 overcomes the force of the spring 40 of the valve means 39 with the stopper ring 34 abutting against the left end face of the wall 20 so that the control member 30 remains stationary. A rubber dirt cover member 46 is provided between the rearward housing member 19 and the manual control rod or line 23. A ring member 47 provides a bearing for the hub portion 38 of the wall 20 to fluid-tightly slide within the bearing. The left end edge of the cover member 46 is provided with an annular groove to provide a grip for the ring member 47. The collar 37 and the valve means 39 cooperate to define within the hub portion 38 two chambers 48 and 49. The chamber 48 communicates with the atmosphere through air filters 50 and 51 and port 52 of the cover member 46. The chamber 49 communicates through a passage 53 with the chamber 27. The chamber 49 is communicated with or isolated from the chamber 26 through the valve assembly formed of the valve means 39 and the seat 45 and a passage 54. The chamber 49 is further communicated with or isolated from the atmosphere through the valve assembly formed of the valve means 39 and the seat 44, the interiors of the tubular valve means 39 and the collar 37, the chamber 48, air filters 50 and 51 and the ports 52. The valve face 43 of the valve means 39 is disposed in position to normally engage the inner valve seat 44. Under these conditions, the valve element 39 prevents communication between the chamber 27 and the atmosphere and permits communication between the chambers 26 and 27 by way of the path 54 and the annular chamber 49.

The valve seat 45 is disposed in the path of communication between the chambers 26 and 27. Consequently, movement of the control member 30 to the left from the position in FIG. 1 permits the valve face 43 to move until the valve face 43 is placed in engagement with the seat 45 and isolates the chambers 26 and 27 from each other. Slight additional movement of the control member 30 is effective to have the seat 44 become disengaged from the valve face 43 but remain in engagement with the outer seat 45. The chambers 26 and 27 remain isolated from each other but chamber 27 is placed in communication with the atmosphere through the passage 53, annular chamber 49 around the control member 30, past the disengaged valve assembly of the seat 44 and valve face 43, through the interiors of the valve means 39 and the collar 37, chamber 48, air filters 50 and 51, and the ports 52. This admits atmospheric air from the chamber 48 to chamber 27 and causes a differential pressure to act on the wall 20 which causes movement of the latter to the left from the position shown in FIG. 1.

Figure 2:
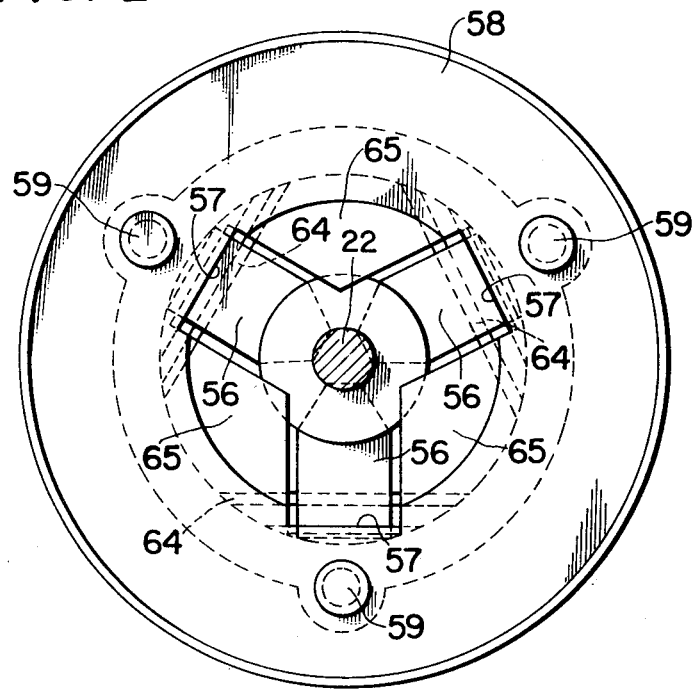
FIG. 2 is a cross sectional view taken along the line II—II in FIG. 1.
Figure 3:
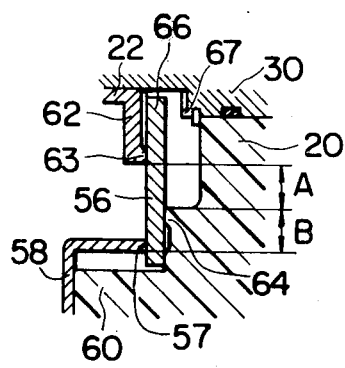
FIG. 3 is an enlarged view of a portion of FIG. 1.

Movement of the wall 20 in response to differential pressure and movement of the control member 30 is transmitted to the rod 22 through force transmitting means 55 which includes a plurality of levers 56 disposed radially at angularly regular intervals and having their outermost ends or the first points abutting against edge portions 57 of the dished plate 58. The dished plate or spring retainer 58 is held in position relative to the wall 20 through means of bolts 59 screwed to the flanged portion 60 of the wall 20. The bolts 59 support the dished plate 58 so as to permit the same to slidingly axially move against the restoring spring 61 anchored at one end at the dished or retaining plate 58 and at the other end at the internal face of the front housing member 13. The inner parts of the levers 56 are adapted to engage a flange 62 of the rod 22 at its edge portion 63 as best shown in FIG. 3. The intermediate portions on the opposite sides of the levers 56 are adapted to engage supporting portions 64 formed in the front side face of the wall 20 as best shown in FIG. 3. The levers 56 are held in position relative to the wall, dished plate 58 and flange 62 of the rod 22, through the extending portions 65 (FIG. 2), flange 60 (FIG. 3) and a diametrically reduced end portion of the control member 30. It should be noted that in the position shown in FIG. 1, the innermost ends 66 of the levers 56 are held in spaced relation to the shoulder 67 of the control member 30 as best shown in FIG. 3 by the large compression restoring spring 61 (FIG. 1).

As shown in FIG. 1, the rearward housing member 19 is provided with studs 68 by which the housing member may be connected to a portion of a vehicle, such as an engine compartment wall (not shown), in position to receive the link 23 from the brake operating pedal 24.

As best shown in FIG. 1, the wall 20 includes an annular diaphragm 69 the outer circumferential edge of which is clamped between the housing members 15 and 19 while the inner circumferential edge is clamped fluid-tightly by an annular groove 70 formed in the wall 20.

In a released condition of the brakes, the servo-motor parts occupy the position shown in FIG. 1, that is, the wall 20 is in its rearward position with a plate 71 on the righthand face of the wall 20 engaged with the housing member 19 to limit rearward movement of the wall 20 by the restoring spring 61. In such condition, the valve means 39 is engaged with the valve seat 44 and disengaged from the other valve seat 45. This permits communication between chambers 26 and 27 but isolates them from the atmosphere in the chamber 48 so that the wall 20 remains stationary. At the same time, the lever ends 66 of the levers 56 are spaced from the shoulder 67 of the control member 30. It should be noted that the space between the valve member 39 and the seat 44 is smaller than that between the shoulder 67 and the innermost ends 66 of the levers 56.

Initial movement of the control member 30 to the left in response to manual effort applied to the pedal 24 causes the valve face 43 to approach and engage the outer valve seat 45 to isolate the both chambers 26 and 27 from each other. However, the valve seat 44 still remains engaged with the valve face 43 and chambers 26 and 27 are also isolated from the source of atmospheric air in the chamber 48. Under these conditions the valve means are disposed in a lap position, that is, an intermediate position in which any additional movement of the control member will result either in the actuation of the valve means 39 or in returning it to its original or rest position. During such initial movement, the shoulder 67 of the control member 30 also approaches but remains in spaced relation to the innermost ends of the levers 56.

Upon an additional leftward movement of control member 30, the valve seat 44 becomes disengaged from the valve face 43 so that the chamber 27 is placed in communication with the atmospheric chamber 48 and permits free flow of fluid through the port 52, air cleaners 50 and 51, chamber 48, interiors of the collar 37 and the valve means 39, chamber 49, and passage 53. Since subatmosphere air is maintained in chamber 26, the resulting differences in pressure at opposite sides of the wall 20 cause the latter to move to the left in the housing. The output member 22 yet remains stationary and as a consequence, the supporting portions 64 of the wall 20 urges the lever ends 66 to pivot about the point of contact with the lever 56 so that the innermost lever ends 66 approach the bearing shoulder 67 of the control member 30. During this pivoting movement of the lever 56, the large spring 61 is distorted and offers a resistance to pivoting of the levers 56. This results in a force being applied to the flange edges 63 and the output rod 22 so that actuation of the master cylinder 11 is initiated. As pressure in chamber 27 increases and the wall 20 continues to move to the left, the reaction or restoring spring 61 is compressed further until the lever innermost ends 66 engage the shoulder 67 of the control member 30. During this period, the output of pressure from the master cylinder has increased and upon engagement of the levers with the shoulder 67, manual force applied to the control means 30 is added to the force produced by the moving wall 20. These forces are together applied to the levers 56 and consequently, the flange 62 and output rod 22 to increase the hydraulic output from the master cylinder.

It should be noted that before the engagement of the lever innermost ends 66 with the shoulder 67, the reaction from the brakes of the vehicle is not transmitted to the control member 30 but is transmitted to the spring 61 to be stored for compressive distortion of the spring 61. By selecting the gauge of the spring in design, reaction is prevented from being transmitted to the control member 30 until the powered effort overcomes the resistance of restoring spring 61 and the friction of certain movable parts in the servomotor, master cylinder and in the actuators and at the brake shoes of the foundation unit. It is true of selection of distances in design between the contacting points on the levers 56, too.

To increase the output of the master cylinder, that is, the force with the brakes are being applied, the pedal 24 must be further depressed by the operator. This continues the movement of the control member 30 and since the wall 20 is also moving in the same direction, the valve face 43 remains disengaged from the inner seat 44 to admit atmospheric air to the chamber 27. As the hydraulic output increases, the hydraulic pressure in the master cylinder reacts against the rod 22 and the flange edge 63 from which a part of the reaction is transmitted through the levers 56 and the control member 30 to the pedal 24 while the remainder of the reaction is transmitted through the levers, supporting portions 64 to the wall 20. In this, the operator may accurately become aware of the degree to which the brakes have been applied, that is, the greater the hydraulic output and brake application, the greater will be the manual force required on the pedal 24.

After the brakes have been applied to the desired degree, pedal movement is stopped and foot pressure is maintained. As movement of the control member 30 stops, the wall 20 continues to move a slight additional amount. This causes the valve face 43 to approach the inner seat 44 and to engage it so that communication between the atmospheric air supply and the chamber 27 is interrupted. Chambers 26 and 27 at this time still remain isolated from each other and the difference in pressure acting on opposite sides of the wall is maintained to apply a constant force on the master cylinder and keep the brakes applied to the selected degree.

To release the brakes, foot pressure is released from the pedal 24. The wall 20 is held stationary by differential pressure and the hydraulic pressure in the master cylinder forces rod 22 to the right. Such force from the master cylinder is transmitted through the levers 56 to shoulder 67 to move the control member 30 to the right and return the pedal 24 toward its rest position. As member 30 moves, the inner seat 44 remains acting while the other outer seat 45 disengages from the valve element 39 and the both chambers 26 and 27 become communicated each other through the passage 54, annular chamber 49 and the passage 53 as shown in FIG. 1 to reduce the pressure in chamber 27. The pressure differential acting on the wall 20 thus decreases and the reaction of the hydraulic pressure coupled with the force of the spring 61 returns the wall toward the right. When the wall reaches a position close to the rear housing member 19, the shoulder 67 of the member 30 returns toward its normal rest position and levers 56 pivot about the edge portions 63 of the flange 62 to permit the outermost ends of the levers to engage the face of the wall 20. The wall 20 then engages the rear housing member 19 as shown in FIG. 1 at its plate 71. Thereafter, movement of the control member 30 to its initial position is effected by spring 35 and limited by the stopper ring member 34.

An important function is performed in the early stage of brake application. It will be noted that initial pedal movement is used only for opening of the valve which results in power output until the innermost lever ends 66 engage the shoulder 67 so that subsequent output is the sum of the forces applied to the levers 56. One of these forces is due to manual effort and another to differential fluid pressure acting on the wall 20.

The significance of the performance achieved by the present invention will be more readily understood by referring to FIG. 3 with reference to which the following reference characters are used as representing the followings.

A — a distance between the edge 63 of the flange 62 of the rod 22 and the supporting portion 64 of the wall 20;

B — a distance between the supporting portion 64 and the edge portion 57 of the dished plate 58;

F — A force established on the wall due to the pressure differential acting on the wall 20 during operation;

W — a compressive force of the spring 61.

The pressure differential acting on the wall 20 establishes a force F A on the lever 56 which is opposite to another force B W established by the spring 61 on the lever. When a predetermined value of the pressure differential is attained, the force F A overcomes the force B W to pivot the levers 56 in the clockwise direction in the view against the compressive force of the spring 61. This causes the innermost ends 66 of the levers to approach the shoulder 67 of the control member 30, thus causing the opposite extremities of the levers 56 to move the dished plate 57 from their inoperative or rest position in a leftward position. The bolts 59 provide axial sliding guide means for the dished plate 58 in such movement.

It is understood that by varying the ratio of A to B, the timed relation of the abutting of the innermost ends 66 to the shoulder 67 may be correspondingly advanced or delayed, in design, without unduly disturbing dimensions by any other associated parts of the servomotor. This makes it possible in design to easily calculate a predetermined output in the early stages of brake application by varying disposition of the supporting portion 64 relative to the edges 57 and 63, so that manual effort comes into play after actual braking begins. This is true of calculation of the spring 61 in design, too.

What is claimed is:

1. A differential servomotor mechanism for use with a master cylinder and in which manual force is supplemented by power assistance, said mechanism comprising a housing 18, a pressure responsive wall 20, 69 in said housing, valve means 42, 43, 44, 45, 30 associated with said wall and being movable relative thereto to control the differential pressure acting on said wall, an output member 55,22 operatively connectable to the master cylinder 11 for delivering pressurized braking hydraulic fluid, restoring means including a retainer 58 and a resilient element 61 for normally urging said wall toward its rest position, said retainer and said wall being permitted a slight axial relative movement therebetween, reaction means 56 interposed between said output member and said wall and having first 57, second 64, third 63, and fourth 66 points spaced radially from outward to inward direction, said first, second, and third points being continuously held in contact with said retainer, wall and output member respectively, said fourth point engaging said valve means when braking is actually performed, said wall being initially movable to transmit force through said second point in assocation with said resilient element to said output member without affecting said valve means, said resilient element therely normally acting on said reaction means through said first point thereof and being distorted during initial movement of said wall in response to resistance of said output member to engage said reaction means with said valve means through said fourth point of said reaction means thereby transmitting both movements of said valve means and said wall to said output member through said third point of said reaction member.

2. A differential servo-motor mechanism in which manual force is supplemented by power assistance, said mechanism comprising a housing 18, a pressure responsive wall 20,69 in said housing, valve means 42, 43, 44, 45, 30 associated with said wall and being manually movable to control the differential pressure acting on said wall, an output member 55,22 operatively connectable to the master cylinder 11 for delivering pressurized braking hydraulic fluid, restoring means including a retainer 58 and a resilient element 61 for normally urging said wall toward its rest position, force dividing means 56 movable relative to said wall, said output member and said valve means and being engageable at spaced points with said wall and said valve means to transmit movement to said output member, said resilient element being interposed between said housing and said force dividing means 56 for acting on the latter at a portion spaced from said points to maintain said force dividing means normally in spaced relation to said valve means while urging said wall toward said rest position, said wall transmitting movement to said output member through one of said points in association with said resilient element without affecting said valve means during an initial stage of movement of said wall, said resilient element being distorted during subsequent movement of said wall to engage said valve means with said force dividing means and to transmit movement of said wall and said valve means together to said output member.

3. A differential servo-motor mechanism in which manual force is supplemented by power assistance, said mechanism comprising a housing 18, a pressure responsive movable wall 20, 69 disposed in said housing, valve means 42, 43, 44, 45, 20 movable a predetermined distance to apply a differential pressure on said wall operative to move the latter relative to said valve means, restoring means including a retainer 58 and a resilient element 61 disposed between said wall and said housing, force dividing means including a plurality of radially spaced levers 56 having radially outermost ends 57 engaged via said retainer with said resilient element 61 and an intermediate portion 64 engaged with said wall, an output member 55, 22 engaged with said levers at a portion 63 thereof opposite to said outermost ends relative to said intermediate portion and operatively connectable to the hydraulic fluid brake master cylinder 11, said levers 56 having radially innermost ends disposed in the path of movement of said valve means and spaced from the latter a distance greater than said predetermined distance, said wall being movable in response to movement of said valve means over said predetermined distance to move said output member without affecting said valve means and distort said resilient element 61, said radially innermost ends of said levers being engaged with said valve means upon distortion of said resilient element for movement of said output member jointly by said wall and said valve means.

4. A differential servo-motor mechanism in which manual force is supplemented by power assistance, said mechanism comprising a housing 18, an output member 55,22 operatively connectable to the hydraulic fluid brake master cylinder 11, wall means 20,69 including a wall movable in an initial range and in a final range, a follow up control valve means 42, 43, 44, 45, 30 carried by said wall and being movable between positions balancing pressures at opposite sides of said wall to hold the latter stationary and establishing different pressures at opposite sides to move said wall, force transmitting means connecting said wall and said output member and including radially disposed levers 56 having intermediate points 64 continuously engaging said wall, resilient means including a spring 61 and a retainer 58, said retainer engaging said levers of outermost portions 67 thereof, said spring being interposed between said housing and said retainer, said spring acting between said housing and said levers at said outermost portions 57 of said levers to maintain radially innermost ends 66 of said levers spaced from said valve means, said output member engaging said levers at a point 63 intermediate said innermost ends and said radially outermost portions to pivot said levers relative to said outermost portions and distort said resilient means in response to movement of said wall in said first range, said innermost ends of said levers engaging said valve means in response to distortion of said resilient means for movement of said output member by unitary movement of said wall and said valve means.

5. A differential servo-motor mechanism as set forth in claim 1 wherein said retainer 58 is of ring-form and said resilient element 61 is a coiled spring, said retainer being interposed between said resilient element and said first points 57 of said reaction means 56.

\* \* \* \* \*